(12) United States Patent
Kondo et al.

(10) Patent No.: US 9,884,516 B2
(45) Date of Patent: Feb. 6, 2018

(54) PNEUMATIC TIRE

(75) Inventors: Toshikazu Kondo, Kobe (JP); Takuya Horiguchi, Kobe (JP); Emiko Mogi, Wako (JP)

(73) Assignees: SUMITOMO RUBBER INDUSTRIES, LTD., Kobe-Shi (JP); HONDA MOTOR CO., LTD., Tokyo (JP)

( * ) Notice: Subject to any disclaimer, the term of this patent is extended or adjusted under 35 U.S.C. 154(b) by 476 days.

(21) Appl. No.: 14/110,975

(22) PCT Filed: Apr. 10, 2012

(86) PCT No.: PCT/JP2012/059743
§ 371 (c)(1),
(2), (4) Date: Oct. 10, 2013

(87) PCT Pub. No.: WO2012/141158
PCT Pub. Date: Oct. 18, 2012

(65) Prior Publication Data
US 2014/0027029 A1    Jan. 30, 2014

(30) Foreign Application Priority Data
Apr. 11, 2011    (JP) .................................. 2011-087351

(51) Int. Cl.
*B60C 11/00*        (2006.01)
*B60C 1/00*         (2006.01)
(Continued)

(52) U.S. Cl.
CPC ............ *B60C 11/00* (2013.01); *B60C 1/0016* (2013.01); *B60C 11/005* (2013.01); *C08L 7/00* (2013.01);
(Continued)

(58) Field of Classification Search
CPC ............... B60C 11/005; B60C 11/0058; B60C 11/0066; B60C 11/0075
See application file for complete search history.

(56) References Cited

U.S. PATENT DOCUMENTS 4,945,964 A  *  8/1990  Takiguchi ............. B60C 1/0016
152/209.5
2006/0272757 A1    12/2006  Mizuno
2010/0224299 A1     9/2010  Miyazaki

FOREIGN PATENT DOCUMENTS

GB        2150509    *  7/1985
JP        60-061312  *  4/1985
(Continued)

OTHER PUBLICATIONS

English machine translation of JP2634704B, dated Jul. 1997.*

*Primary Examiner* — Robert C Dye
(74) *Attorney, Agent, or Firm* — Birch, Stewart, Kolasch & Birch, LLP

(57) ABSTRACT

Provided is a pneumatic tire capable of improving fuel efficiency, handling stability, and durability in a balanced manner. The present invention relates to a pneumatic tire, comprising a tread that includes a cap layer and a base layer, the cap layer and the base layer satisfying relationships represented by the following formulas (1) to (3):

$$50/50 \leq Vc/Vb \leq 90/10 \quad (1)$$

wherein Vc is the volume of the cap layer and Vb is the volume of the base layer, $$0.65 \leq E^*c/E^*b < 1.00 \quad (2), \text{ and}$$

$$1.30 \leq (\tan \delta c/E^*c)/(\tan \delta b/E^*b) < 2.40 \quad (3)$$

wherein $E^*c$ and $\tan \delta c$ are the complex modulus and the loss tangent, respectively, of the cap layer at 30° C., and $E^*b$ (Continued)

and tan δb are the complex modulus and the loss tangent, respectively, of the base layer at 30° C.

5 Claims, 1 Drawing Sheet

(51) Int. Cl.
    *C08L 7/00*           (2006.01)
    *C08L 9/06*           (2006.01)

(52) U.S. Cl.
    CPC ......... *C08L 9/06* (2013.01); *B60C 2011/0025* (2013.01)

(56) References Cited

FOREIGN PATENT DOCUMENTS

| | | | |
|---|---:|---|---|
| JP | 2634704 | B * | 7/1997 |
| JP | 2001-180225 | A | 7/2001 |
| JP | 2003-291610 | A | 10/2003 |
| JP | 2006-335983 | A | 12/2006 |
| JP | 2010-84059 | A | 4/2010 |
| JP | 2010-084059 | A | 4/2010 |

* cited by examiner

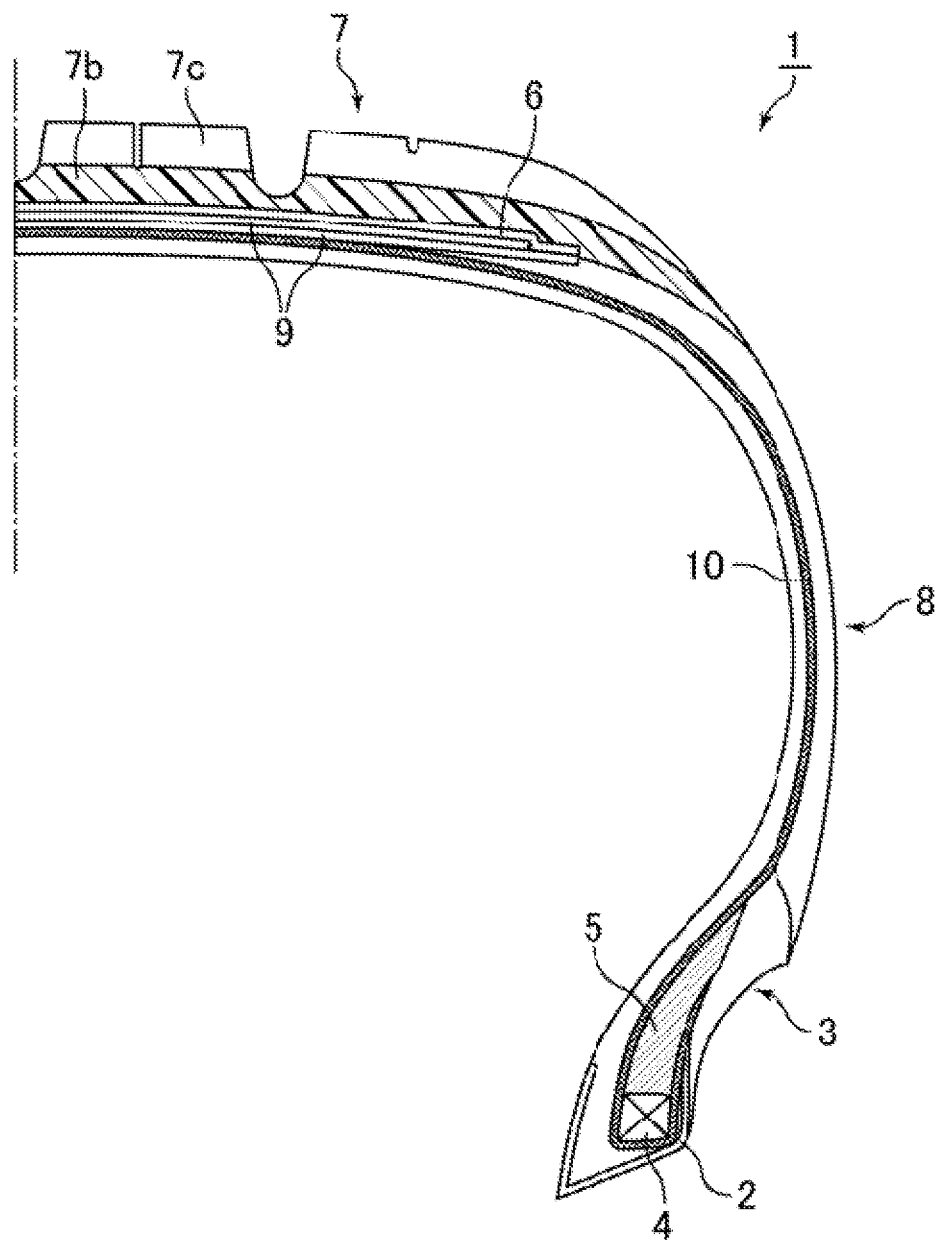

PNEUMATIC TIRE

TECHNICAL FIELD

The present invention relates to a pneumatic tire.

BACKGROUND ART

High fuel efficient automobiles have been developed in order to protect the global environment. For such development, tires for automobiles with high fuel efficiency have also been desired.

Fuel efficiency can generally be improved by reducing rolling resistance. Rolling resistance is largely attributable to energy loss caused by the repeated deformation of the tire during running. In order to reduce rolling resistance, it is suggested that, for example, a tread, which more largely contributes to rolling resistance than any other tire component, be formed to have a two-layer structure in which a rubber composition with small energy loss is provided on the inner side (base layer) and a rubber composition excellent in abrasion resistance is provided on the outer side (cap layer) (see, for example, Patent Literature 1). However, in recent years, fuel efficiency needs to be further improved.

If the amount of filler is reduced in order to further improve fuel efficiency, then the stiffness of a tread tends to be reduced and handling stability tends to be deteriorated. Meanwhile, if crosslink density is increased so as to enhance the stiffness, then abrasion resistance and chipping resistance tend to be deteriorated and the resulting tire tends not to secure sufficient durability. Therefore, a method of improving fuel efficiency while maintaining good handling stability and durability is needed.

CITATION LIST

Patent Literature

Patent Literature 1: JP-A 2003-291610

SUMMARY OF INVENTION

Technical Problem

The present invention aims to solve the above problems and provide a pneumatic tire capable of improving fuel efficiency, handling stability, and durability in a balanced manner.

Solution to Problem

The present inventors have examined a pneumatic tire capable of improving fuel efficiency, handling stability, and durability in a balanced manner, and have focused on a tread that includes a cap layer and a base layer. The inventors have found that when the base layer and the cap layer of the tread satisfy specific relationships by making the base layer harder than the cap layer while making the tan δ of the base layer smaller than that of the cap layer, driving stiffness is enhanced so that fuel efficiency better than predicted from rolling resistance can be obtained, and at the same time good handling stability and durability can be achieved. Thus, the inventors have reached the present invention.

Specifically, the present invention relates to a pneumatic tire, comprising a tread that includes a cap layer and a base layer, the cap layer and the base layer satisfying relationships represented by the following formulas (1) to (3):

$$50/50 \leq Vc/Vb \leq 90/10 \quad (1)$$

wherein Vc is a volume of the cap layer and Vb is a volume of the base layer, $$0.65 \leq E^*c/E^*b < 1.00 \quad (2), \text{ and}$$

$$1.30 \leq (\tan \delta c/E^*c)/(\tan \delta b/E^*b) < 2.40 \quad (3)$$

wherein $E^*c$ and $\tan \delta c$ are a complex modulus and a loss tangent, respectively, of the cap layer at 30° C., and $E^*b$ and $\tan \delta b$ are a complex modulus and a loss tangent, respectively, of the base layer at 30° C.

The base layer preferably comprises butadiene rubber containing a 1,2-syndiotactic polybutadiene crystal.

The $\tan \delta b$ is preferably 0.190 or less.

Advantageous Effects of Invention

The pneumatic tire according to the present invention comprises a tread that includes a cap layer and a base layer, and the cap layer and the base layer satisfy specific relationships. Therefore, the pneumatic tire has fuel efficiency, handling stability, and durability which are improved in a balanced manner.

BRIEF DESCRIPTION OF DRAWINGS

FIG. 1 is a sectional view showing a part of a tire for passenger cars according to an embodiment of the present invention.

DESCRIPTION OF EMBODIMENTS

Hereinafter, an example of preferred embodiments of the pneumatic tire of the present invention is explained with reference to the FIGURE. FIG. 1 is a sectional view showing a part of a tire for passenger cars according to an embodiment of the present invention. Although FIG. 1 shows an exemplary tire for passenger cars, the pneumatic tire of the present invention is applicable to any other tire such as heavy-load tires.

In FIG. 1, the vertical direction is a radial direction of a tire, the horizontal direction is an axis direction of the tire, and the direction vertical to the plane of the page is a circumferential direction of the tire. A tire 1 for passenger cars includes a tread portion 7, a pair of sidewall portions 8 that extend inwardly in the tire radial direction from each end of the tread portion 7, bead portions 3 each located at an inner end of each of the sidewall portions 8, and chafers 2 each located on top of a rim. A carcass 10 is formed between the opposite bead portions 3, and a breaker portion 9 is disposed on the outer side of the carcass 10 in the tire radial direction.

The carcass 10 is formed of at least one carcass ply in which carcass cords are arranged. The carcass ply extends from the tread portion 7 along the sidewall portion 8, and is folded around a bead core 4 and a bead apex 5, which extends from the upper end of the bead core 4 toward the sidewall, from the inside to the outside in the tire axis direction and thereby fixed. The breaker portion 9 includes two or more breaker plies in each of which breaker cords are arranged, and the breaker cords of the breaker plies are oriented differently from each other so that they cross each other. A band 6 for protecting the breaker portion 9 is disposed on the upper side of the breaker portion 9.

The tread portion 7 includes a cap layer (cap tread) 7c that is disposed to be in contact with a road surface, and a base layer (base tread) 7b that is disposed on the inner side of the cap layer 7c in the tire radial direction.

The cap layer 7c and the base layer 7b (hereinafter, referred to simply as cap layer and base layer, respectively) satisfy relationships represented by the following formulas (1) to (3).

$$50/50 \leq Vc/Vb \leq 90/10 \quad (1)$$

(in the formula (1), Vc is the volume of the cap layer and Vb is the volume of the base layer.)

$$0.65 \leq E^*c/E^*b < 1.00 \quad (2)$$

$$1.30 \leq (\tan \delta c/E^*c)/(\tan \delta b/E^*b) < 2.40 \quad (3)$$

(in the formulas (2) and (3), $E^*c$ and $\tan \delta c$ are the complex modulus and the loss tangent, respectively, of the cap layer at 30° C., and $E^*b$ and $\tan \delta b$ are the complex modulus and the loss tangent, respectively, of the base layer at 30° C.)

In the formula (1), if Vc/Vb is less than 50/50, the proportion of the cap layer is small, which may cause exposure of the base layer, reducing grip performance. Conversely, if Vc/Vb is more than 90/10, the proportion of the base layer is small, which tends not to lead to a sufficient increase in drive efficiency and good fuel efficiency.

The Vc and Vb are volumes at 25° C.

In the formula (2), if $E^*c/E^*b$ is less than 0.65, the stiffness of the cap layer tends to be too low to provide good handling stability. Conversely, if $E^*c/E^*b$ is 1.00 or more, driving stiffness tends not to be sufficiently enhanced and good fuel efficiency tends not to be achieved. In terms of achieving better effects of the present invention, the lower limit of $E^*c/E^*b$ in the formula (2) is preferably 0.67, more preferably 0.70, and still more preferably 0.72, and the upper limit thereof is preferably 0.98, more preferably 0.95, and still more preferably 0.90.

In the formula (3), if $(\tan \delta c/E^*c)/(\tan \delta b/E^*b)$ is less than 1.30, fuel efficiency tends not to be sufficiently improved, and chipping resistance and handling stability tend to be deteriorated. Conversely, if $(\tan \delta c/E^*c)/(\tan \delta b/E^*b)$ is 2.40 or more, the durability of the base layer tends to be deteriorated. In terms of achieving better effects of the present invention, the lower limit of $(\tan \delta c/E^*c)/(\tan \delta b/E^*b)$ in the formula (3) is preferably 1.40, and more preferably 1.50, and the upper limit thereof is preferably 2.35, and more preferably 2.30.

In terms of achieving better effects of the present invention, $E^*b$ is preferably 6.5 or more, and more preferably 6.8 or more, and is preferably 9.5 or less, and more preferably 9.0 or less.

Meanwhile, $E^*c$ may be appropriately adjusted according to $E^*b$. The $E^*c$ is preferably 5.0 or more, and more preferably 5.3 or more, and is preferably 9.0 or less, and more preferably 8.5 or less.

In terms of achieving better effects of the present invention, $\tan \delta b$ is preferably 0.050 or more, and more preferably 0.080 or more, and is preferably 0.190 or less, and more preferably 0.170 or less.

Meanwhile, $\tan \delta c$ may be appropriately adjusted according to $\tan \delta b$. The $\tan \delta c$ is preferably 0.140 or more, and more preferably 0.150 or more, and is preferably 0.250 or less, and more preferably 0.220 or less.

The $E^*c$, $E^*b$, $\tan \delta c$, and $\tan \delta b$ can be measured by the methods described in the following examples. The $E^*c$, $E^*b$, $\tan \delta c$, and $\tan \delta b$ may appropriately vary as long as they satisfy the formulas (2) and (3).

In terms of achieving better effects of the present invention, the base layer and the cap layer preferably further satisfy a relationship represented by the following formula (4).

$$-2.8 \times E^*c/E^*b + 3.8 \leq (\tan \delta c/E^*c)/(\tan \delta b/E^*b) \leq -3 \times E^*c/E^*b + 4.8 \quad (4)$$

The base layer and the cap layer satisfying the formulas (2) to (4) can be more suitably prepared by adjusting the hardness (Hs) of the layers. The Hs of the base layer at 23° C. is preferably 64 or more, and more preferably 65 or more, and is preferably 75 or less, and more preferably 73 or less. The Hs of the cap layer at 23° C. is preferably 58 or more, and more preferably 60 or more, and is preferably 72 or less, and more preferably 70 or less.

The Hs can be measured by the method described in the following examples.

Hs may be adjusted by any method, for example, by adjusting the amount of oil, by adjusting the type and amount of filler, or by adjusting the amount of sulfur. Alternatively, Hs may be adjusted by using a rubber component that provides high stiffness, such as butadiene rubber containing a 1,2-syndiotactic polybutadiene crystal (SPB-containing BR). Hereinafter, specific examples of the formulations of the base layer and the cap layer will be described, but the present invention is not limited to these examples.

(Base Layer)

Examples of the rubber component used in the base layer include diene rubbers such as natural rubber (NR), epoxidized natural rubber (ENR), butadiene rubber (BR), and styrene-butadiene rubber (SBR). Particularly, BR and NR are preferred, and combination use of BR and NR is more preferred. The BR may suitably be SPB-containing BR.

The amount of BR based on 100% by mass of the rubber component in the base layer is preferably 5 to 55% by mass, and more preferably 15 to 45% by mass. Also, the amount of SPB-containing BR is preferably 5 to 55% by mass, and more preferably 15 to 45% by mass. Also, the amount of NR is preferably 35 to 85% by mass, and more preferably 55 to 65% by mass.

The base layer preferably contains carbon black. The carbon black preferably has a nitrogen adsorption specific surface area ($N_2SA$) of 30 to 120 $m^2/g$, more preferably 60 to 90 $m^2/g$. Moreover, the amount of carbon black is preferably 20 to 85 parts by mass, and more preferably 40 to 65 parts by mass, per 100 parts by mass of the rubber component.

The amount of oil in the base layer is preferably 1 to 20 parts by mass, and more preferably 2 to 16 parts by mass, per 100 parts by mass of the rubber component.

The amount of sulfur in the base layer is preferably 2.0 to 4.0 parts by mass, and more preferably 2.4 to 3.6 parts by mass, per 100 parts by mass of the rubber component.

(Cap Layer)

Examples of the rubber component used in the cap layer include diene rubbers mentioned above for the base layer. Particularly, SBR, BR and NR are preferred, and combination use of SBR, BR and NR is more preferred. Moreover, the SBR may suitably be one obtained by modifying solution-polymerized SBR by a compound represented by the following formula (I) (modified S-SBR (modified SBR described in JP-A 2010-111753)).

[Chemical 1]

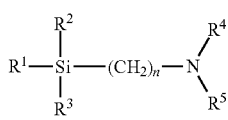

(I)

In the formula, $R^1$, $R^2$, and $R^3$ are the same as or different from one another, and each represent an alkyl group, an alkoxy group (preferably a C1-C8 alkoxy group, more preferably a C1-C6 alkoxy group, and still more preferably a C1-C4 alkoxy group), a silyloxy group, an acetal group, a carboxyl group (—COOH), a mercapto group (—SH), or a derivative thereof; $R^4$ and $R^5$ are the same as or different from each other, and each represent a hydrogen atom or an alkyl group (preferably a C1-C4 alkyl group); and n represents an integer (preferably 1 to 5, more preferably 2 to 4, and still more preferably 3).

Specific examples of the compound represented by the formula (I) include 3-aminopropyldimethylmethoxysilane, 3-aminopropylmethyldimethoxysilane, and 2-dimethylaminoethyltrimethoxysilane. These may be used alone or in combination with one another.

The amount of SBR based on 100% by mass of the rubber component in the cap layer is preferably 35 to 65% by mass, and more preferably 45 to 55% by mass. Also, the amount of the modified SBR is preferably 35 to 65% by mass, and more preferably 45 to 55% by mass. Also, the amount of BR is preferably 15 to 45% by mass, and more preferably 25 to 35% by mass. Also, the amount of NR is preferably 5 to 35% by mass, and more preferably 15 to 25% by mass.

The cap layer preferably contains silica. The silica preferably has a nitrogen adsorption specific surface area ($N_2SA$) of 100 to 220 $m^2/g$, more preferably 140 to 180 $m^2/g$. Moreover, the amount of silica in the cap layer is preferably 45 to 95 parts by mass, and more preferably 65 to 75 parts by mass, per 100 parts by mass of the rubber component.

The cap layer preferably contains carbon black. The carbon black preferably has a nitrogen adsorption specific surface area ($N_2SA$) of 50 to 150 $m^2/g$, more preferably 80 to 120 $m^2/g$. Moreover, the amount of carbon black is preferably 1 to 40 parts by mass, and more preferably 2 to 30 parts by mass, per 100 parts by mass of the rubber component.

(Production Method)

The pneumatic tire of the present invention can be produced by any known method. For example, the above ingredients are kneaded using a rubber kneader such as a Banbury mixer or an open roll mill to prepare an unvulcanized rubber composition, the unvulcanized rubber composition is extruded into the shape of a cap layer or a base layer, and the thus-obtained extrudates are arranged in a usual manner and assembled with other tire components in a tire building machine to prepare an unvulcanized tire. Then, the unvulcanized tire is heated and pressurized in a vulcanizer to produce a pneumatic tire.

The tread may be prepared by assembling sheet-shaped unvulcanized rubber compositions into a predetermined shape or by feeding an unvulcanized rubber composition into an extruder with two or more screws and then forming a two-layer extrudate at a head outlet of the extruder.

EXAMPLES

The invention will be more specifically described with reference to examples. However, the invention is not limited only thereto.

The chemical agents used in examples and comparative examples are explained below.

NR: TSR20
SBR: HPR355 (modified S-SBR that has been modified by the compound represented by the formula (I)) produced by JSR Corp.
BR: BR150B produced by UBE INDUSTRIES, LTD.
VCR (SPB crystal-containing BR): VCR617 produced by UBE INDUSTRIES, LTD.
Carbon black 1: SEAST NH (N351, $N_2SA$: 74 $m^2/g$) produced by TOKAI CARBON CO., LTD.
Carbon black 2: DIABLACK I (N220, $N_2SA$: 114 $m^2/g$) produced by Mitsubishi Chemical Corp.
Silica: ULTRASIL VN3 (average primary particle size: 15 nm, $N_2SA$: 175 $m^2/g$) produced by Evonik Degussa
Silane coupling agent: Si266 produced by Evonik Degussa
Oil: Process X-140 produced by JX Nippon Oil & Energy Corporation
Processing aid: EF44 produced by Struktol
Wax: SUNNOC N produced by OUCHI SHINKO CHEMICAL INDUSTRIAL CO., LTD.
Antioxidant: Antigene 6C (N-(1,3-dimethylbutyl)-N'-phenyl-p-phenylenediamine) produced by Sumitomo Chemical Co., Ltd.
Stearic acid: Stearic acid "Tsubaki" produced by NOF Corporation
Zinc oxide: Zinc oxide #1 produced by Mitsui Mining & Smelting Co., Ltd.
Sulfur 1: SEIMI sulfur produced by NIPPON KANRYU INDUSTRY CO., LTD.
Sulfur 2: Powdered sulfur produced by Karuizawa Iou K.K.
Vulcanization accelerator 1: Nocceler CZ (N-cyclohexyl-2-benzothiazolylsulfenamide) produced by Ouchi Shinko Chemical Industrial Co., Ltd.
Vulcanization accelerator 2: Nocceler D (N,N'-diphenylguanidine) produced by Ouchi Shinko Chemical Industrial Co., Ltd.

Chemical agents other than sulfur and vulcanization accelerators were kneaded in a 1.7-L Banbury mixer (produced by KOBE STEEL, LTD.) according to each of the compounding formulations shown in Table 1. Then, sulfur and vulcanization accelerator(s) were added to the resulting kneaded mixture and they were kneaded using an open roll mill to prepare an unvulcanized rubber composition.

The resulting unvulcanized rubber composition was press-vulcanized at 150° C. for 30 minutes in a 2-mm-thick mold to prepare a vulcanized rubber composition (vulcanized rubber sheet).

The obtained vulcanized rubber sheets were evaluated as follows. Table 1 shows the results.

(Hs)

The Hs of the vulcanized rubber sheets were determined by a method in accordance with JIS K 6253:2006. The measurement temperature was 23° C.

(Viscoelasticity Test)

The loss tangent tan δ and the complex modulus E* of the vulcanized rubber sheets at 30° C. were measured using a viscoelastic spectrometer (produced by Iwamoto Seisakusho Co., Ltd.) at a frequency of 10 Hz, an initial strain of 10%, and a dynamic strain of 2%. A smaller loss tangent tan δ indicates less heat build-up and better fuel efficiency. A larger complex modulus E* indicates higher stiffness.

Examples and Comparative Examples

Each unvulcanized rubber composition was formed into the shape of a base layer or a cap layer in a tire building machine, and the resulting products were assembled with other tire components according to each of the formulations shown in Table 2, and then vulcanized at 150° C. for 30 minutes. Thus, test tires (tire size: 205/55R16) were produced.

The resulting test tires were evaluated as follows. Table 2 shows the results.

(Rolling Resistance Test)

The rolling resistance of the test tires was measured with a rolling resistance testing machine by running the tire with a rim of 16×6.5 J at an internal pressure of 220 kPa, a load of 4.10 kN, and a velocity of 80 km/h. The results are expressed as an index calculated according to the following formula. A smaller index indicates smaller rolling resistance and better fuel efficiency.

(Rolling resistance index)=(rolling resistance of each example)/(rolling resistance of Comparative Example 1)×100

(Fuel Efficiency Measurement)

The test tires were measured for fuel efficiency in JC08 mode in accordance with TRIAS (method for testing new-type automobiles). The results are expressed as a rate (%) of improvement compared to the fuel efficiency of Comparative Example 1.

(Cut and Chip Resistance Test)

The test tires were subjected to thermal aging in an oven at 80° C. for 10 days, and then subjected to a 5-km run on a gravel road. After the run, the size of a chip and the number of chips formed on the tread were observed and evaluated according to the following criteria.

O: The number of chips is less than 50, and each chip has a size of 5 mm or smaller.

Δ: The number of chips is 50 or more, and each chip has a size of 5 mm or smaller.

x: The number of chips is 50 or more, and some of the chips have a size of 5 mm or larger.

(Handling Stability Test)

The test tires were mounted on a Honda Civic produced by Honda Motor Co., Ltd, and the car was driven on the Okayama test course in Japan. The response (speed, linearity) to steering by a test driver was evaluated according to the following criteria.

OO: The car responds quickly and handles well.

O: The car responds moderately.

Δ: The response is slightly delayed.

x: The response is greatly delayed, and it is thus impossible to drive the car safely.

(Durability Test)

A cut (crack) with a width of 1 mm and a depth of 1 mm was formed in the bottom of the main groove of the cap tread of each test tire. After a 10000-km run of the test tire (internal pressure: 250 kPa) in a bench testing machine, the degree of crack growth was evaluated according to the following criteria.

O: The crack did not reach the base layer.

x: The crack reached the base layer.

(Driving Stiffness Test)

The driving stiffness of the test tires was determined using a tire rolling testing machine shown in FIG. 3 of JP-A 2010-144018. The results are expressed as an index calculated according to the following formula. A larger index indicates higher driving stiffness and better fuel efficiency.

(Driving stiffness index)=(driving stiffness of each example)/(driving stiffness of Comparative Example 1)

TABLE 1

| | | Cap layer | | | | | | Base layer | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Formulation (part(s) by mass) | NR | 20 | 20 | 20 | 20 | 20 | — | 60 | 60 | 60 | 60 | 40 | 60 |
| | SBR | 70 | 50 | 50 | 50 | 50 | 75 | — | — | — | — | — | — |
| | BR | 10 | 30 | 30 | 30 | 30 | 25 | 20 | 40 | 20 | — | — | 40 |
| | VCR | — | — | — | — | — | — | 20 | — | 20 | 40 | 60 | — |
| | Carbon black 1 | — | — | — | — | — | — | 36 | 60 | 55 | 40 | 38 | 70 |
| | Carbon black 2 | 5 | 5 | 20 | 5 | 5 | 40 | — | — | — | — | — | — |
| | Silica | 45 | 65 | 60 | 75 | 70 | 55 | — | — | — | — | — | — |
| | Silane coupling agent | 3.6 | 5.2 | 4.8 | 6.0 | 5.6 | 4.4 | — | — | — | — | — | — |
| | Oil | 15 | 20 | 28 | 3 | 3 | 40 | 10 | 20 | 15 | 5 | — | 25 |
| | Processing aid | — | 3 | 3 | 3 | 3 | — | — | — | — | — | — | — |
| | Wax | 2 | 2 | 2 | 2 | 2 | 2 | 2 | 2 | 2 | 2 | 2 | 2 |
| | Antioxidant | 3 | 3 | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 | 2 | 2 |
| | Zinc oxide | 3 | 3 | 3 | 3 | 3 | 3 | 3 | 3 | 3 | 3 | 3 | 3 |
| | Sulfur 1 | — | — | — | — | — | — | 3.5 | 2.0 | 3.5 | 3.5 | 4.5 | 2.0 |
| | Sulfur 2 | 2.0 | 1.5 | 1.5 | 1.5 | 2.2 | 1.5 | — | — | — | — | — | — |
| | Vulcanization accelerator 1 | 2.0 | 2.0 | 2.0 | 2.0 | 2.0 | 2.0 | 1.8 | 1.8 | 1.8 | 1.8 | 1.8 | 1.8 |
| | Vulcanization accelerator 2 | 1.5 | 1.5 | 1.0 | 1.5 | 1.5 | 1.5 | — | — | — | — | — | — |
| | Total | 184.1 | 213.2 | 230.3 | 207.0 | 202.3 | 254.4 | 161.3 | 193.8 | 185.3 | 160.3 | 154.3 | 208.8 |
| Evaluation | Hs | 60 | 61 | 62 | 66 | 68 | 65 | 60 | 62 | 66 | 68 | 72 | 64 |
| | E* | 4.5 | 5.8 | 6.5 | 8.2 | 9.0 | 8.5 | 4.8 | 6.2 | 7.0 | 8.5 | 9.5 | 7.0 |
| | tan δ | 0.150 | 0.180 | 0.210 | 0.200 | 0.180 | 0.270 | 0.110 | 0.160 | 0.140 | 0.120 | 0.120 | 0.180 |
| | tan δ/E* | 0.033 | 0.031 | 0.032 | 0.024 | 0.020 | 0.032 | 0.023 | 0.026 | 0.020 | 0.014 | 0.013 | 0.026 |

TABLE 2

|  | Example |  |  |  |  | Comparative Example |  |  |  |
|---|---|---|---|---|---|---|---|---|---|
|  | 1 | 2 | 3 | 4 | 5 | 1 | 2 | 3 | 4 |
| Cap layer | 3 | 3 | 3 | 4 | 2 | 6 | 3 | 3 | 3 |
| Base layer | 4 | 4 | 3 | 4 | 4 | 1 | — | 4 | 5 |
| E*c | 6.5 | 6.5 | 6.5 | 8.2 | 5.8 | 8.5 | 6.5 | 6.5 | 6.5 |
| E*b | 8.5 | 8.5 | 7.0 | 8.5 | 8.5 | 4.8 | 6.5 | 8.5 | 9.5 |
| Vc/Vb | 70/30 | 85/15 | 70/30 | 70/30 | 70/30 | 70/30 | 100/0 | 95/5 | 70/30 |
| tan δ c | 0.210 | 0.210 | 0.210 | 0.200 | 0.180 | 0.270 | 0.210 | 0.210 | 0.210 |
| tan δ b | 0.120 | 0.120 | 0.140 | 0.120 | 0.120 | 0.110 | 0.210 | 0.120 | 0.120 |
| E*c/E*b | 0.76 | 0.76 | 0.93 | 0.96 | 0.68 | 1.77 | 1.00 | 0.76 | 0.68 |
| (tan δ c/E*c)/(tan δ b/E*b) | 2.29 | 2.29 | 1.62 | 1.73 | 2.20 | 1.39 | 1.00 | 2.29 | 2.56 |
| Cut and chip resistanc | ◯ | ◯ | ◯ | ◯ | ◯ | ◯ | ◯ | ◯ | ◯ |
| Handling stability | ◯◯ | ◯◯ | ◯ | ◯◯ | Δ | ◯ | Δ | ◯ | ◯ |
| Durability | ◯ | ◯ | ◯ | ◯ | ◯ | ◯ | ◯ | ◯ | x |
| Rolling resistance index | 84 | 86 | 85 | 83 | 82 | 100 | 87 | 86 | 84 |
| Driving stiffness index | 116 | 108 | 104 | 128 | 108 | 100 | 100 | 103 | 123 |
| Rate (%) of improvement in fuel efficiency | 2.9 | 2.5 | 2.4 | 3.6 | 2.9 | 0.0 | 1.9 | 2.1 | 3.3 |

|  | Comparative Example |  |  |  |  |  |  |  |
|---|---|---|---|---|---|---|---|---|
|  | 5 | 6 | 7 | 8 | 9 | 10 | 11 | 12 |
| Cap layer | 2 | 1 | 1 | 2 | 5 | 3 | 3 | 3 |
| Base layer | 5 | 3 | 4 | 1 | 4 | 1 | 2 | 6 |
| E*c | 5.8 | 4.5 | 4.5 | 5.8 | 9.0 | 6.5 | 6.5 | 6.5 |
| E*b | 9.5 | 7.0 | 8.5 | 4.8 | 8.5 | 4.8 | 6.2 | 7.0 |
| Vc/Vb | 70/30 | 70/30 | 70/30 | 70/30 | 70/30 | 70/30 | 70/30 | 70/30 |
| tan δ c | 0.180 | 0.150 | 0.150 | 0.180 | 0.180 | 0.210 | 0.210 | 0.210 |
| tan δ b | 0.120 | 0.140 | 0.120 | 0.110 | 0.120 | 0.110 | 0.160 | 0.180 |
| E*c/E*b | 0.61 | 0.64 | 0.53 | 1.21 | 1.06 | 1.35 | 1.05 | 0.93 |
| (tan δ c/E*c)/(tan δ b/E*b) | 2.46 | 1.67 | 2.36 | 1.35 | 1.42 | 1.41 | 1.25 | 1.26 |
| Cut and chip resistanc | ◯ | ◯ | ◯ | ◯ | x | ◯ | ◯ | ◯ |
| Handling stability | Δ | x | x | x | ◯◯ | x | Δ | ◯ |
| Durability | x | ◯ | ◯ | ◯ | ◯ | ◯ | ◯ | ◯ |
| Rolling resistance index | 82 | 80 | 79 | 81 | 82 | 84 | 86 | 86 |
| Driving stiffness index | 116 | 83 | 94 | 83 | 142 | 87 | 98 | 104 |
| Rate (%) of improvement in fuel efficiency | 3.4 | 2.2 | 2.7 | 1.8 | 4.4 | 1.7 | 2.0 | 2.2 |

The tire of Comparative Example 1 includes a standard two-layered tread.

The tire of Comparative Example 2 is a fuel-efficient tire whose tread was formed from a low heat build-up rubber composition. Thus, the tire of Comparative Example 2 had improved fuel efficiency but exhibited poor handling stability. Further, the tire was less effective at improving fuel efficiency than the tire of Example 2 which had the same level of rolling resistance.

In the tire of Comparative Example 3, the proportion of the base layer is small and the formula (1) is not satisfied. Therefore, the tire was less effective at improving fuel efficiency than the tire of Example 2 which had the same level of rolling resistance.

In Comparative Examples 4 and 5, since the base layer is too hard and the formula (3) is not satisfied, the tires had greatly deteriorated durability. Further, the tire of Comparative Example 5, in which the formula (2) is also not satisfied, exhibited poor handling stability.

In Comparative Examples 6 and 7, since the cap layer is too soft and the formula (2) is not satisfied, the tires had greatly deteriorated handling stability.

In Comparative Example 8, since both the cap layer and the base layer are soft and the formula (2) is not satisfied, the tire had greatly deteriorated handling stability. Further, the tire was less effective at improving fuel efficiency than the tire of Example 5 which had the same level of rolling resistance.

In Comparative Example 9, since the cap layer is too hard and the formula (2) is not satisfied, the tire had greatly deteriorated cut and chip resistance.

In Comparative Example 10, since the base layer is too soft and the formula (2) is not satisfied, the tire had greatly deteriorated handling stability. Further, the tire was less effective at improving fuel efficiency than the tire of Example 1 which had the same level of rolling resistance.

In Comparative Example 11, since the difference in physical properties between the cap layer and the base layer is small and the formulas (2) and (3) are not satisfied, the tire had poor handling stability. Further, the tire was less effective at improving fuel efficiency than the tire of Example 2 which had the same level of rolling resistance.

In the tire of Comparative Example 12, the difference in physical properties between the cap layer and the base layer is small and the formula (3) is not satisfied. Therefore, the tire was less effective at improving fuel efficiency than the tire of Example 2 which had the same level of rolling resistance.

In contrast, in the tires of Examples 1 to 5 including a tread including a cap layer and a base layer which satisfy the formulas (1) to (3), the fuel efficiency, handling stability, and durability were improved in a balanced manner compared to those of Comparative Example 1. Further, the tires had a tendency to be more effective at improving fuel efficiency than the corresponding tires of comparative examples which had the same levels of rolling resistance.

Comparison of Examples 1 and 2 shows that the tire of Example 1 with a larger proportion of the base layer was more effective at improving fuel efficiency.

Comparison of Examples 1 and 3 shows that the tire of Example 1 including a base layer with higher stiffness was more effective at improving fuel efficiency.

In the tire of Example 4 including a cap layer and a base layer both having high stiffness, the fuel efficiency was greatly improved while maintaining good handling stability and durability.

As shown in Example 5, even when the difference in stiffness between the cap layer and the base layer was increased, the handling stability was maintained high enough to cause no problems.

REFERENCE SIGNS LIST

1. Tire for passenger cars
2. Chafer
3. Bead portion
4. Bead Core
5. Bead Apex
6. Band
7. Tread portion
7c. Cap layer (cap tread)
7b. Base layer (base tread)
8. Sidewall portion
9. Breaker portion
10. Carcass

The invention claimed is:

1. A pneumatic tire, comprising a tread that includes a cap layer and a base layer, the cap layer and the base layer satisfying relationships represented by the following formulas (1) to (3):

$$50/50 \leq Vc/Vb \leq 70/30 \tag{1}$$

wherein Vc is a volume of the cap layer and Vb is a volume of the base layer, $$0.65 \leq E^*c/E^*b < 1.00 \tag{2, and}$$

$$1.50 \leq (\tan \delta c/E^*c)/(\tan \delta b/E^*b) < 2.40 \tag{3}$$

wherein $E^*c$ and $\tan \delta c$ are a complex modulus and a loss tangent, respectively, of the cap layer at 30° C., $E^*b$ and $\tan \delta b$ are a complex modulus and a loss tangent, respectively, of the base layer at 30° C., and $E^*b$ is 8.5 to 9.5 MPa.

2. The pneumatic tire according to claim 1, wherein the base layer comprises butadiene rubber containing a 1, 2-syndiotactic polybutadiene crystal.

3. The pneumatic tire according to claim 2, wherein the $\tan \delta b$ is 0.190 or less.

4. The pneumatic tire according to claim 1, wherein the $\tan \delta b$ is 0.190 or less.

5. The pneumatic tire according to claim 1, wherein the cap layer and the base layer satisfying relationships represented by the following formulas (4) and (5):

$$0.72 \leq E^*c/E^*b < 0.90 \tag{4, and}$$

$$1.50 \leq (\tan \delta c/E^*c)/(\tan \delta b/E^*b) < 2.30 \tag{5, and}$$

wherein $E^*b$ is 8.5 to 9.0 MPa, $E^*c$ is 5.3 to 8.5 MPa, $\tan \delta b$ is 0.080 to 0.170, and $\tan \delta c$ is 0.150 to 0.220.

* * * * *